US009896019B2

(12) United States Patent
Boyer (10) Patent No.: US 9,896,019 B2
(45) Date of Patent: Feb. 20, 2018

(54) CARGO STOP BLOCK

(71) Applicant: William J. Boyer, Lakewood, WA (US)

(72) Inventor: William J. Boyer, Lakewood, WA (US)

( * ) Notice: Subject to any disclaimer, the term of this patent is extended or adjusted under 35 U.S.C. 154(b) by 0 days.

(21) Appl. No.: 14/956,811

(22) Filed: Dec. 2, 2015

(65) Prior Publication Data

US 2016/0152171 A1 Jun. 2, 2016

Related U.S. Application Data

(60) Provisional application No. 62/086,343, filed on Dec. 2, 2014.

(51) Int. Cl.
*B60P 7/08* (2006.01)
*B64D 9/00* (2006.01)

(52) U.S. Cl.
CPC ............ *B60P 7/0892* (2013.01); *B64D 9/003* (2013.01)

(58) Field of Classification Search
CPC ............................. B60P 7/0823; B60P 7/0892
USPC ......... 410/10–12, 20, 23, 30, 34–36, 41, 99, 410/49–50, 94–97, 100, 120, 121, 155; 188/32; 248/499, 351; 244/118.1, 137.1
See application file for complete search history.

(56) References Cited

U.S. PATENT DOCUMENTS

| | | | |
|---|---|---|---|
| 3,251,489 A * | 5/1966 | Davidson | B60P 1/36 410/79 |
| 4,842,460 A * | 6/1989 | Schlesch | B60P 7/0892 410/121 |
| 5,046,690 A | 9/1991 | Nordstrom | |
| 6,568,636 B2 | 5/2003 | Fitzgerald et al. | |
| 2009/0169321 A1 | 7/2009 | Flannigan | |
| 2009/0212584 A1 | 8/2009 | Hill | |
| 2014/0326763 A1 | 11/2014 | Ferriggi, Jr. | |

OTHER PUBLICATIONS

Shane Thomas, "International Search Report and Written Opinion," issued in PCT/US15/63539 dated Jan. 29, 016, 9 pages, United States Patent and Trademark Office, United States of America.

* cited by examiner

*Primary Examiner* — Stephen Gordon
(74) *Attorney, Agent, or Firm* — George C. Rondeau, Jr.; Davis Wright Tremaine LLP (57) ABSTRACT

A cargo stop for use with a tie down strap with attachment members attachable to anchors in a floor of a cargo compartment usable for carrying cargo. The cargo stop having an elongated cargo engagement wall member portion with a rearward facing elongated engagement wall sized for engagement with cargo to resist forward movement of cargo engaging the engagement wall beyond the engagement wall, an elongated backing member portion rigidly connected to the cargo engagement wall member portion and projecting forward beyond the cargo engagement wall member portion, and an elongated strap receiving recess sized to receive the tie down strap. The length of the engagement wall being sized to position the left end portion of the engagement wall in proximity with a starboard wall of the cargo compartment and the right end portion of the engagement wall in proximity with a port wall of the cargo compartment.

10 Claims, 15 Drawing Sheets

Figure 13:
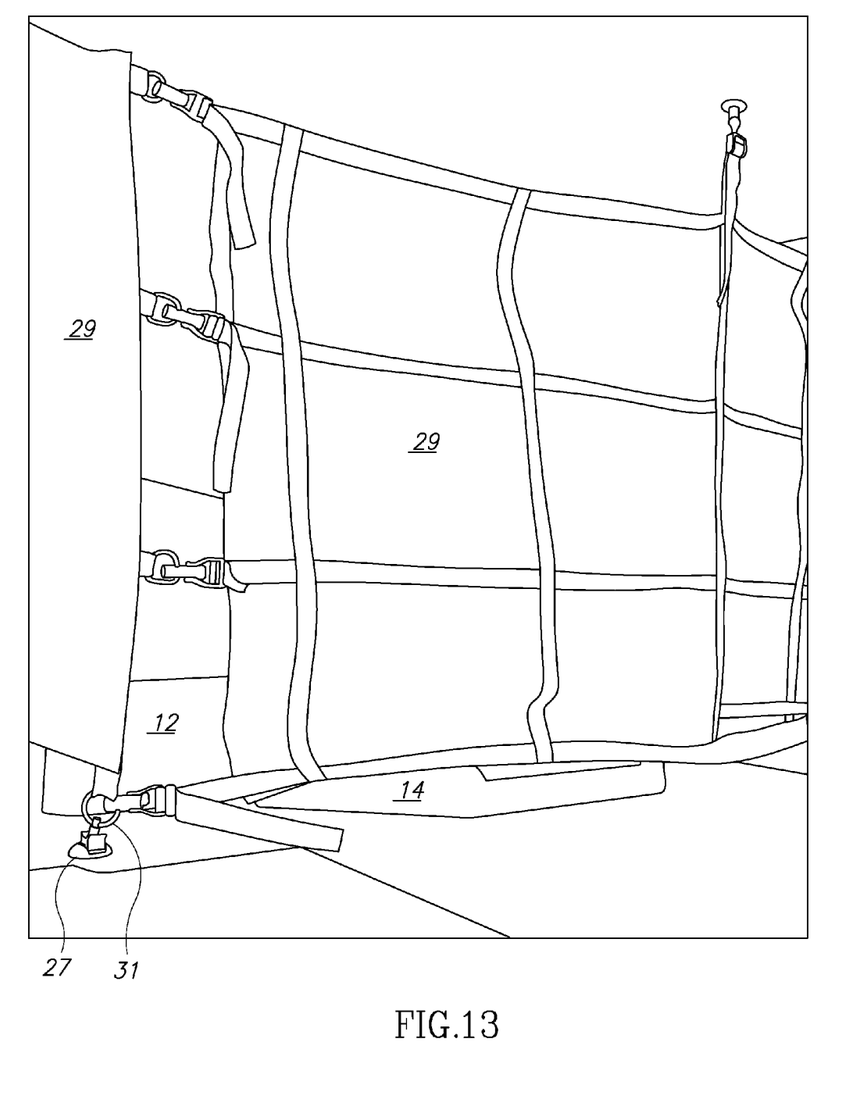
FIG. 13 is a front left side perspective view of the cargo stop block of FIG. 5 installed in the cargo compartment of a commercial jet aircraft showing the placement of the cargo stop block relative to a cargo net.
Figure 14:
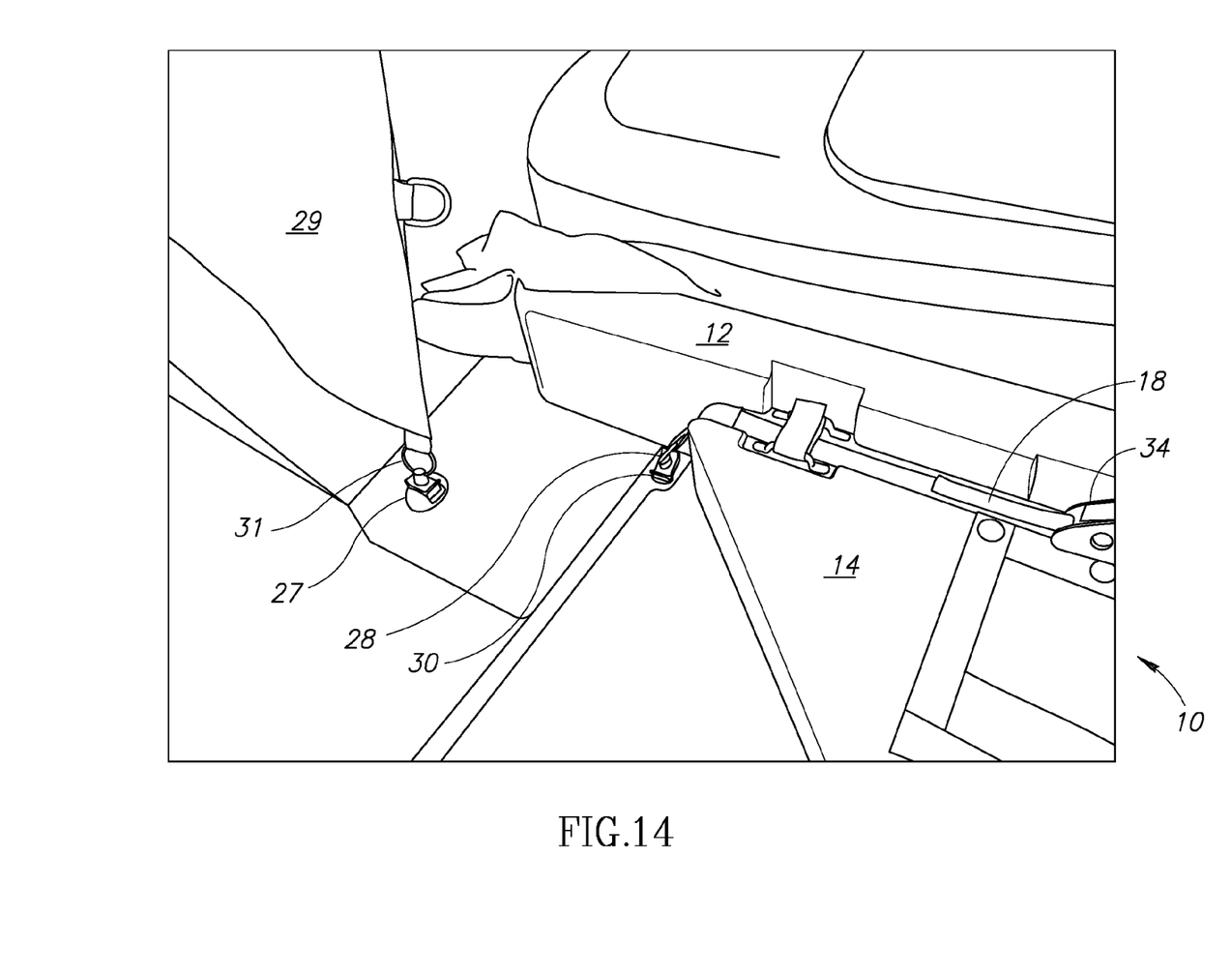
FIG. 14 is a front view of the cargo stop block of FIG. 5 showing a left side portion of the cargo stop block.

FIG. 15 though the cargo net 29 is not shown in FIGS. 13 and 14 so that the cargo net anchor 27 and the attachment member 31 can be seen.

CARGO STOP BLOCK

CROSS-REFERENCE

This application claims priority from U.S. Provisional Patent Application No. 62/086,343, filed Dec. 2, 2014, the entire contents of which are incorporated herein by reference.

FIELD OF INVENTION

The present invention relates to a device for controlling movement of cargo in the cargo compartment of commercial jet aircraft.

BACKGROUND

In commercial jet aircraft, such as a Boeing 737, Airbus or others, cargo (including containers and/or other cargo, including baggage) in the cargo compartment (also known as the cargo hold or bay) has a tendency to slide forward and rearward and shift about on the cargo bay floor during flight and other movement of the aircraft. Such forward movement of cargo, especially on landing, is undesirable.

Cargo nets are typically used in cargo compartments to contain and limit forward movement of cargo. The nets are clipped into cargo net anchors in the cargo compartment floor and elsewhere. With cargo nets, sometimes cargo can move forward sufficiently to hit the cargo net anchor in the cargo compartment floor at a location adjacent to the cargo compartment door and disconnect the cargo net from the cargo net anchor. Cargo can also rip the cargo net and allow cargo, including luggage, to move forward beyond the cargo net. This can result in movement of the cargo into the space needed to permit full inward movement of the cargo compartment access door, which blocks full opening of the door until a cargo handler can gain entrance to the cargo compartment and clear the cargo away from the door.

Accordingly, it is desirable that a solution be achieved that is inexpensive, easy to install and use, and does not alter the airframe, especially not in a manner requiring FAA certification. A device providing such a solution may allow for the continued usage of cargo nets. The cargo stop block of the present invention satisfies these desirable goals.

BRIEF DESCRIPTION OF THE DRAWINGS

Exemplary embodiments are illustrated in referenced figures. It is intended that the embodiments and figures disclosed herein are considered illustrative rather than restrictive.

DETAILED DESCRIPTION

A first embodiment of a cargo stop block 10 in accordance with the present invention is shown in FIGS. 1-4. The illustrated first embodiment of the cargo stop block 10 includes a cargo engagement wall member portion 12, a backing member portion 14 and a strap receiving recess 16 for receiving a tie down strap 18, which preferably is a conventional cargo tie down strap of the design already in use with the aircraft for tying down cargo using the cargo net anchors in the cargo compartment floor and elsewhere. FIGS. 1-4 shown the cargo stop block 10 positioned within a cargo compartment 20 and resting on the cargo compartment floor 22.

Figure 15:
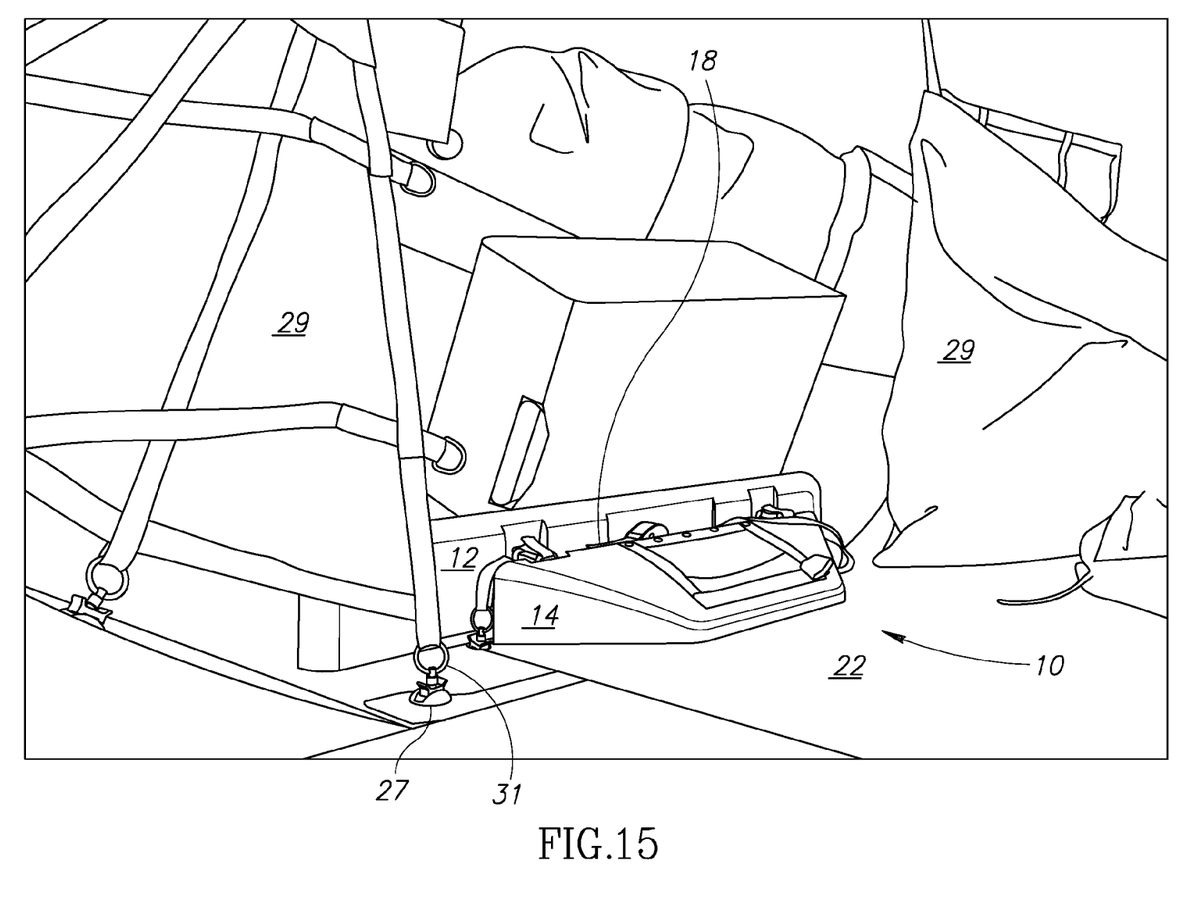
FIG. 15 is a front left side perspective view of the cargo stop block of FIG. 5 installed in the cargo compartment of a commercial jet aircraft showing the cargo stop block retaining baggage against forward movement.

The cargo engagement wall member portion 12 is sized and arranged when in use to extend laterally, transverse to the longitudinal axis of the cargo compartment 20, extending at least partially between the port interior wall 24 and starboard interior wall 26 of the cargo compartment. The cargo engagement wall member portion 12 does not need to extend fully between the port and starboard interior walls 24 and 26, but it is desirable to have the end portion of the cargo engagement wall member portion extend laterally beyond and rearward of the cargo net anchor adjacent to the cargo door to protect it from contact or impact by the cargo during flight or other movement of the aircraft and thereby avoid the cargo net connected to that cargo net anchor from being undesirably disconnection of the cargo net anchor or the cargo net anchor from being pulled out of the cargo compartment floor. This is illustrated in FIGS. 13-15 for the second embodiment of the cargo stop block 10 described below, and shows a cargo net anchor 27 located toward the cargo compartment access door with the end portion of the cargo engagement wall member portion 12 positioned rearward of the cargo net anchor 27 to hold back cargo and protect the cargo net anchor 27. A cargo net 29 with an attachment member 31 is shown releasably engaged with the cargo net anchor 27 with the cargo net 29 holding back cargo, in particular luggage. In this manner the attachment member 31 is prevented from being disconnection from the cargo net anchor 27 or the cargo net anchor 27 from being pulled out of the cargo compartment floor, which both also prevent the cargo from moving forward sufficiently to block full opening of the compartment access door. FIGS. 14 and 15 shown a central portion of the cargo net 29 removed and illustrate the cargo engagement wall member portion 12 engaging and holding back luggage.

The backing member portion 14 is rigidly connected to the cargo engagement wall member portion 12, such as by thermo forming or any other suitable means. Alternatively, the cargo stop block 10 may be formed as an integral, one-piece unit.

Figure 1:
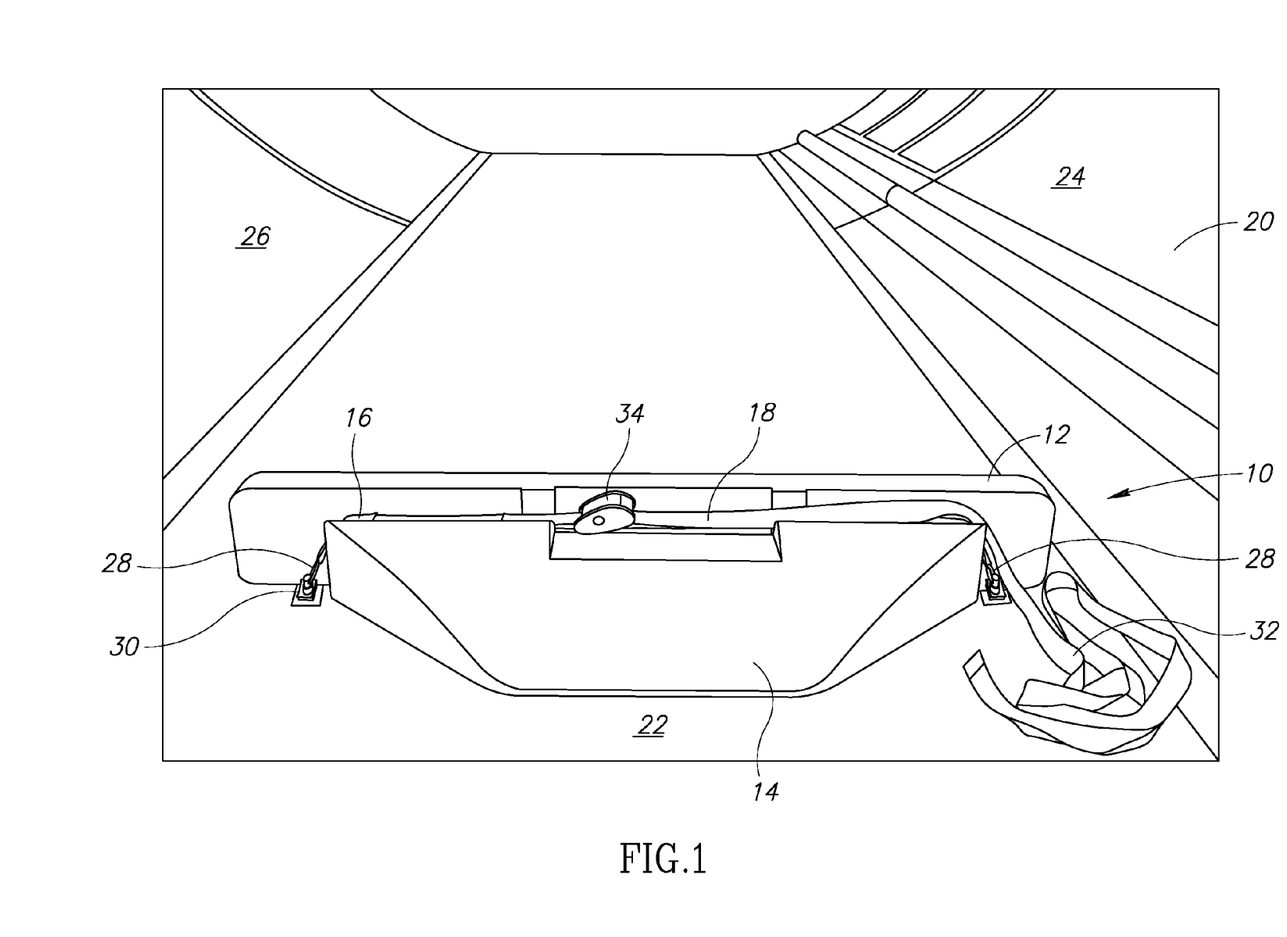
FIG. 1 is a front view of a first embodiment of a cargo stop block according to the present invention installed in the cargo compartment of a commercial jet aircraft.
Figure 2:
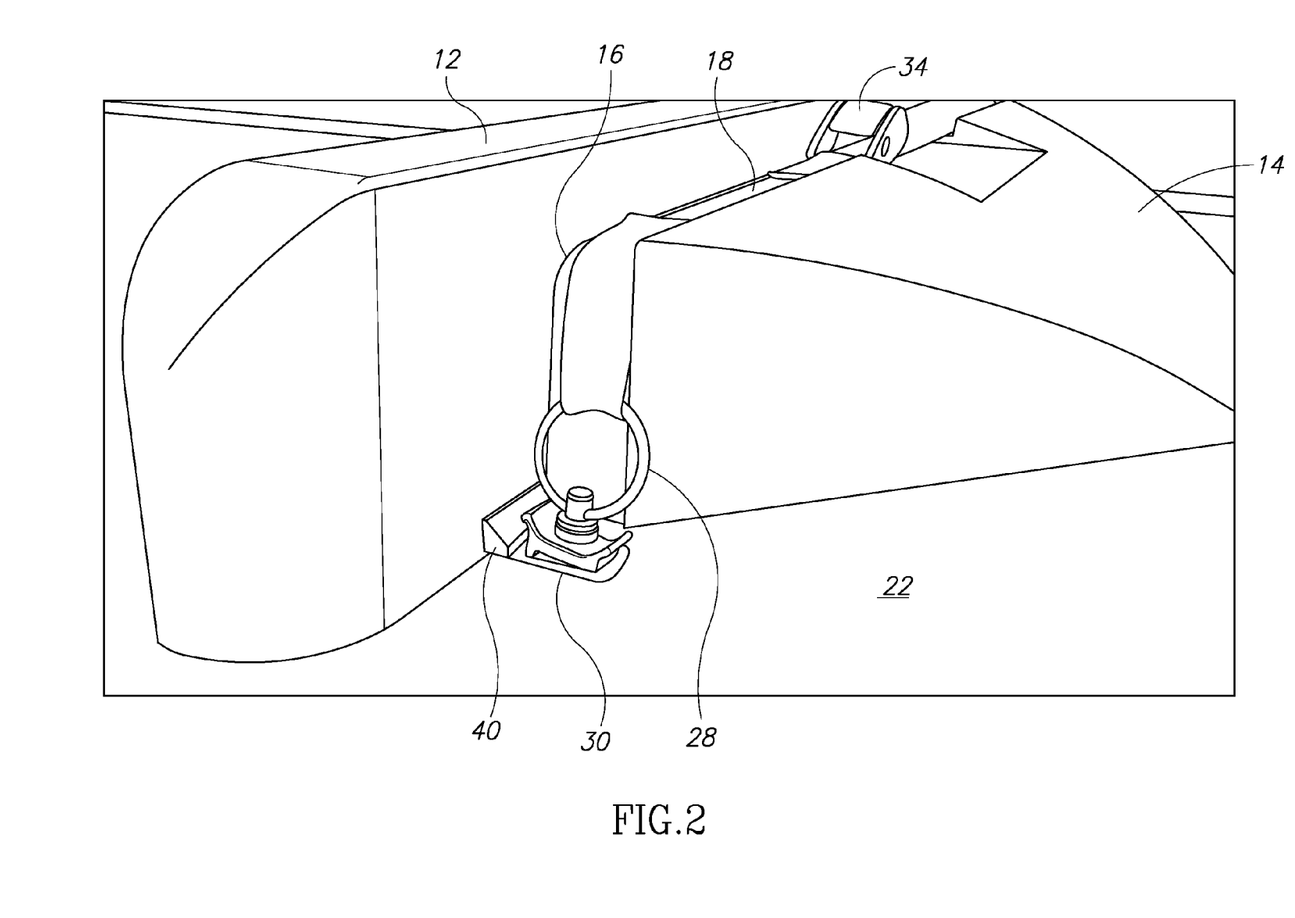
FIG. 2 is a front left side perspective view of the cargo stop block of FIG. 1.

The strap receiving recess 16 in the illustrated embodiment is a channel extending laterally at a location adjacent to the juncture of the cargo engagement wall member portion 12 and the backing member portion 14, as best seen in FIGS. 1 and 2. The strap receiving recess 16 has spaced apart forward and rearward walls and is wide enough to receive the tie down strap 18 and deep enough that the tie down strap will not come out of the strap receiving recess when the cargo stop block 10 is in use, such as when the forwardly directed force of the cargo is applied to the cargo engagement wall member portion 12 during flight or other movement of the aircraft. Both ends of the tie down strap 18 have a clip 28, preferably as part of the conventional design cargo tie down strap already in use with the aircraft. The cargo stop block 10 is attached to the cargo compartment floor 22 by placing the tie down strap 18 in the strap receiving recess 16 with the clip 28 at one end to the strap connected to one cargo net anchor 30 and the clip 28 at the other end of the strap connected to another cargo net anchor 32.

The tie down strap 18 further includes a ratchet, pull buckle or other mechanism 34 to allow the strap to be shortened and placed under tension to tightly cinch down and hold the cargo stop block 10 to the cargo compartment floor 22 and kept that way during use of the cargo stop block, but yet allowing the tension to be quickly and easily manually released so that the cargo stop block can be quickly and easily removed when no longer needed such as when the cargo is to be removed from the cargo compartment 20.

Figure 3:
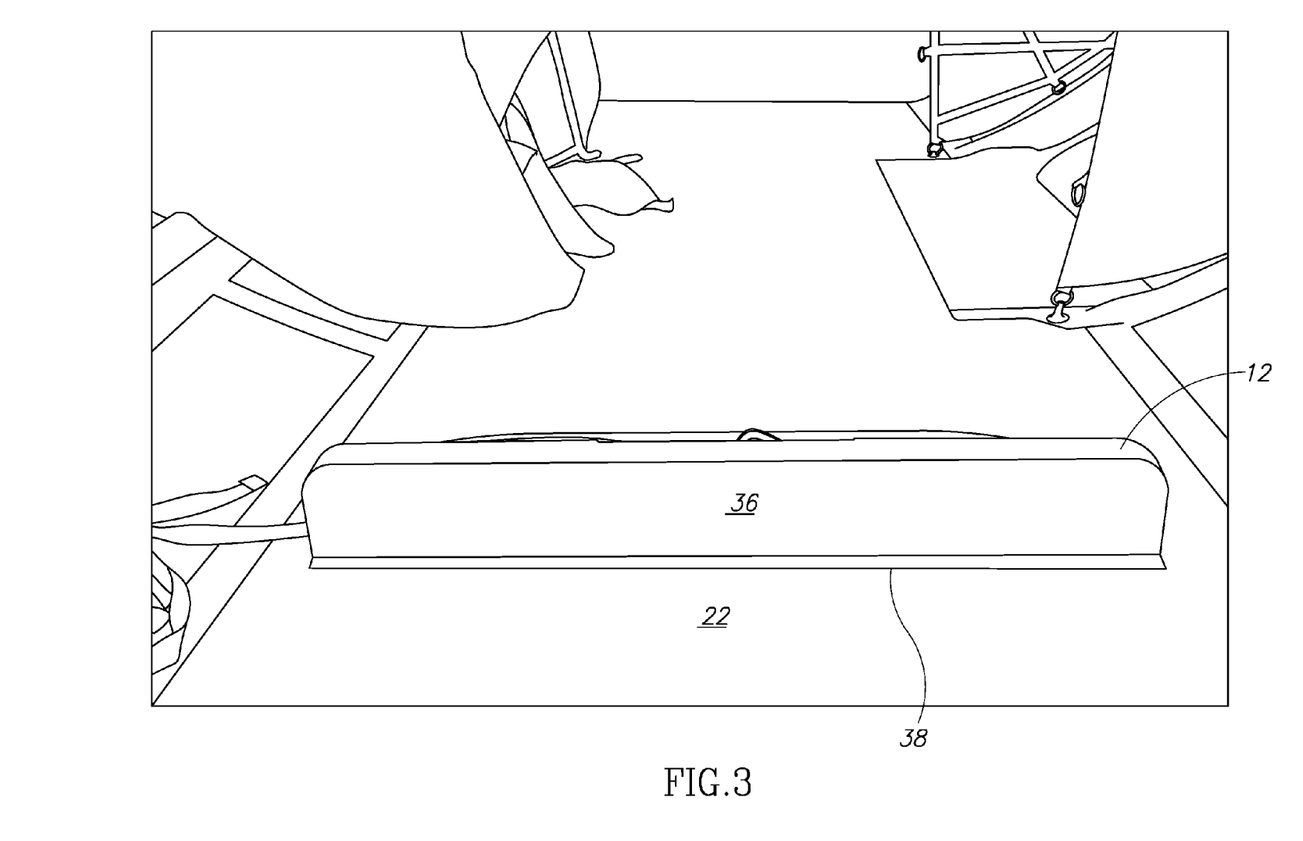
FIG. 3 is a rear view of the cargo stop block of FIG. 1.
Figure 4:
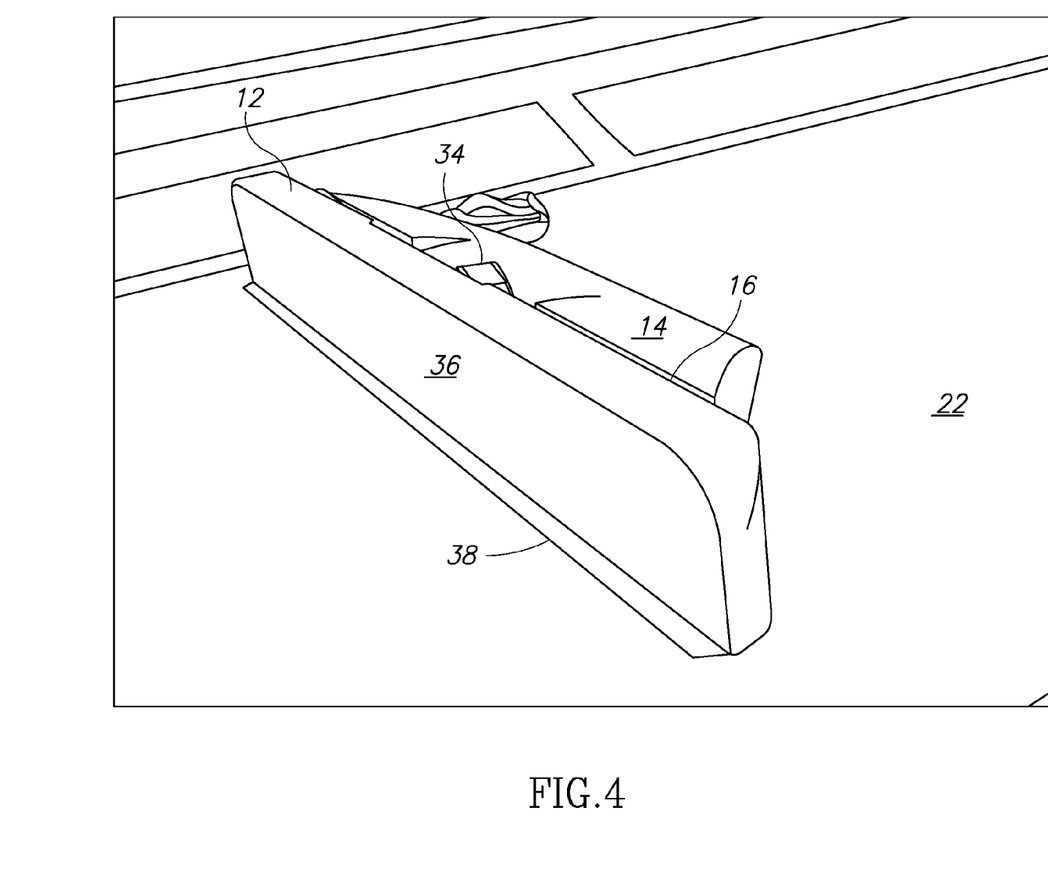
FIG. 4 is a rear left side perspective view of the cargo stop block of FIG. 1.
Figure 5:
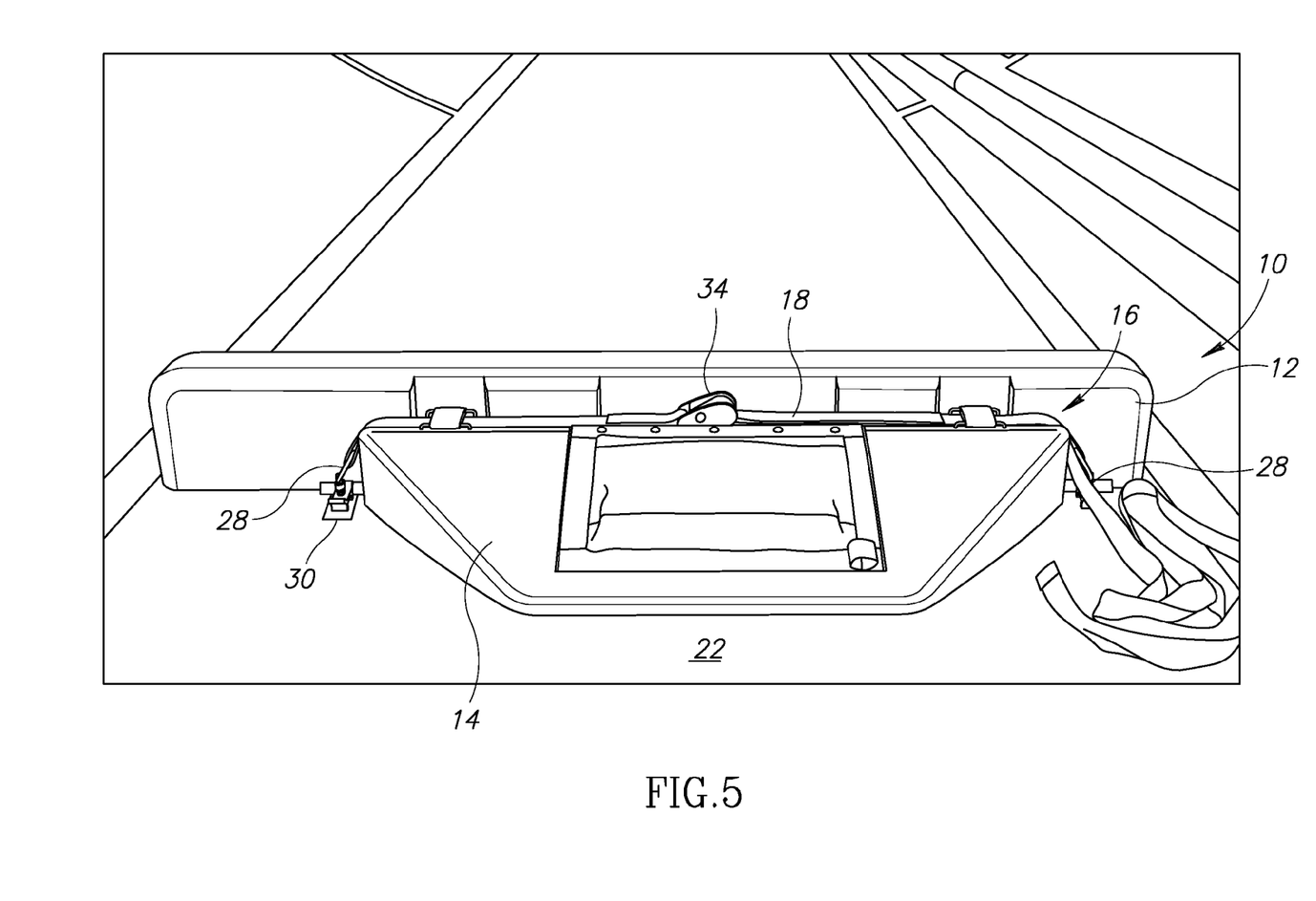
FIG. 5 is a front view of a second embodiment of the cargo stop block according to the present invention installed in the cargo compartment of a commercial jet aircraft.
Figure 6:
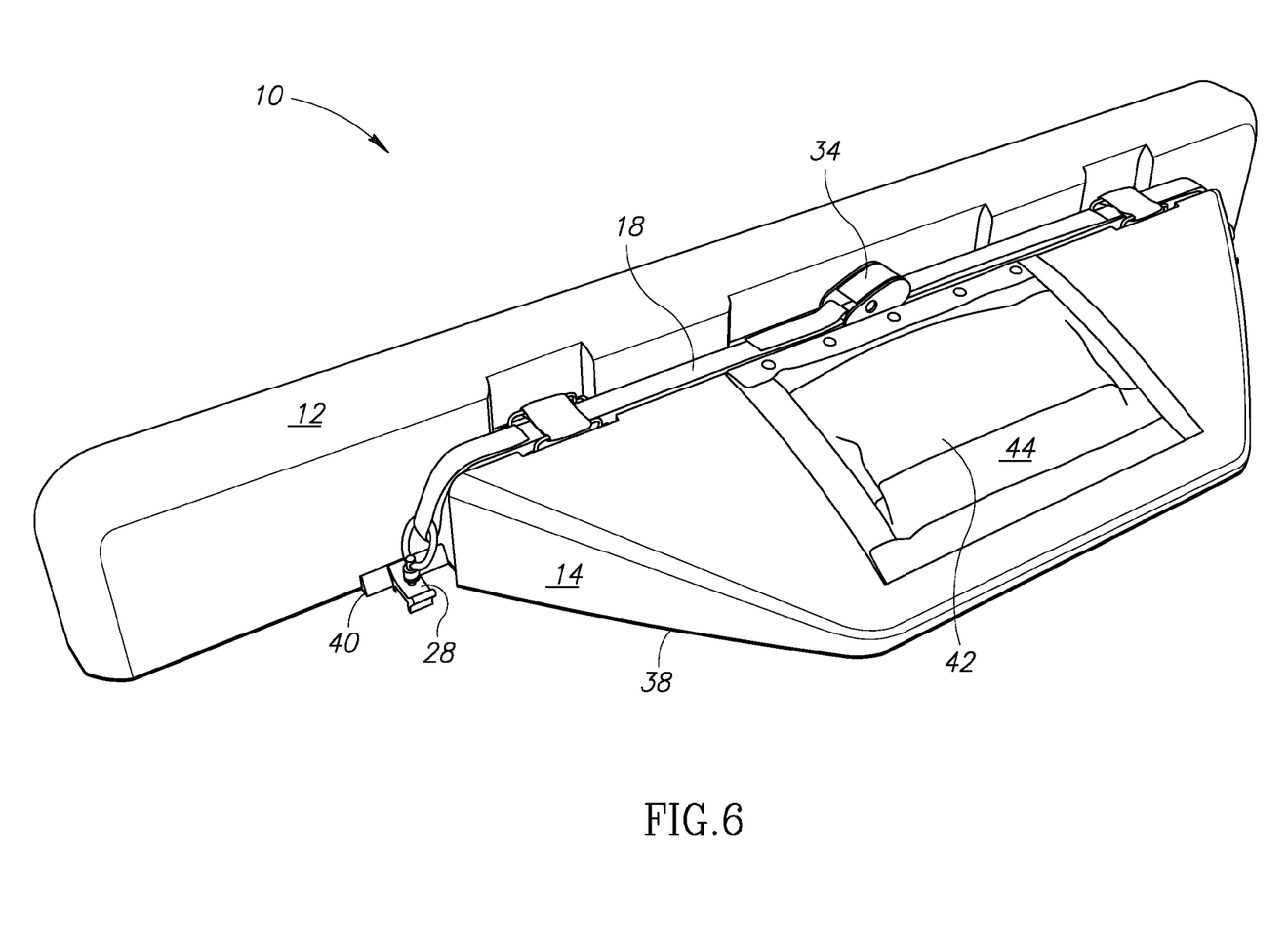
FIG. 6 is a front left side perspective view of the cargo stop block of FIG. 5.
Figure 7:
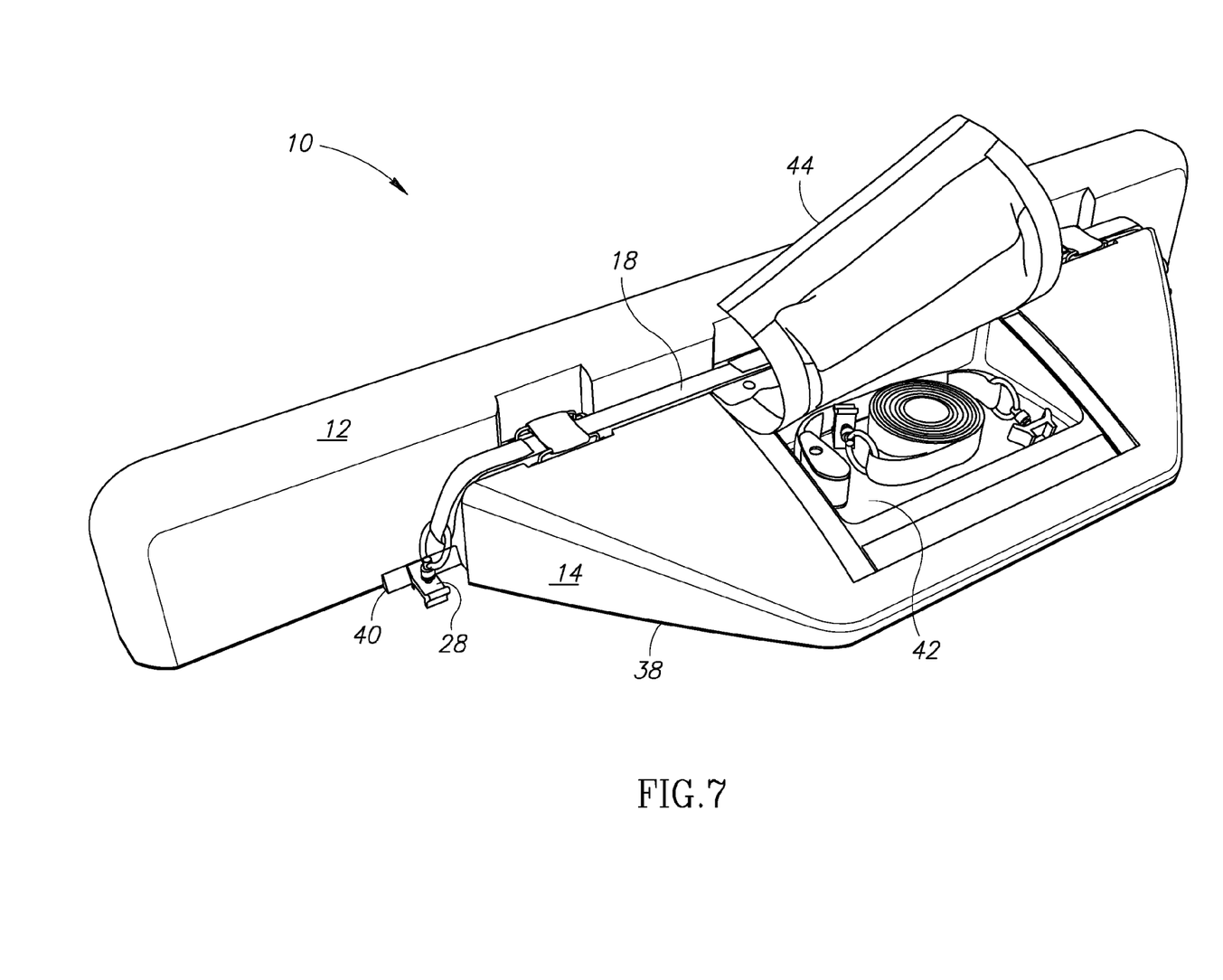
FIG. 7 is a front left side perspective view of the cargo stop block of FIG. 5 with a storage compartment in an open state.
Figure 8:
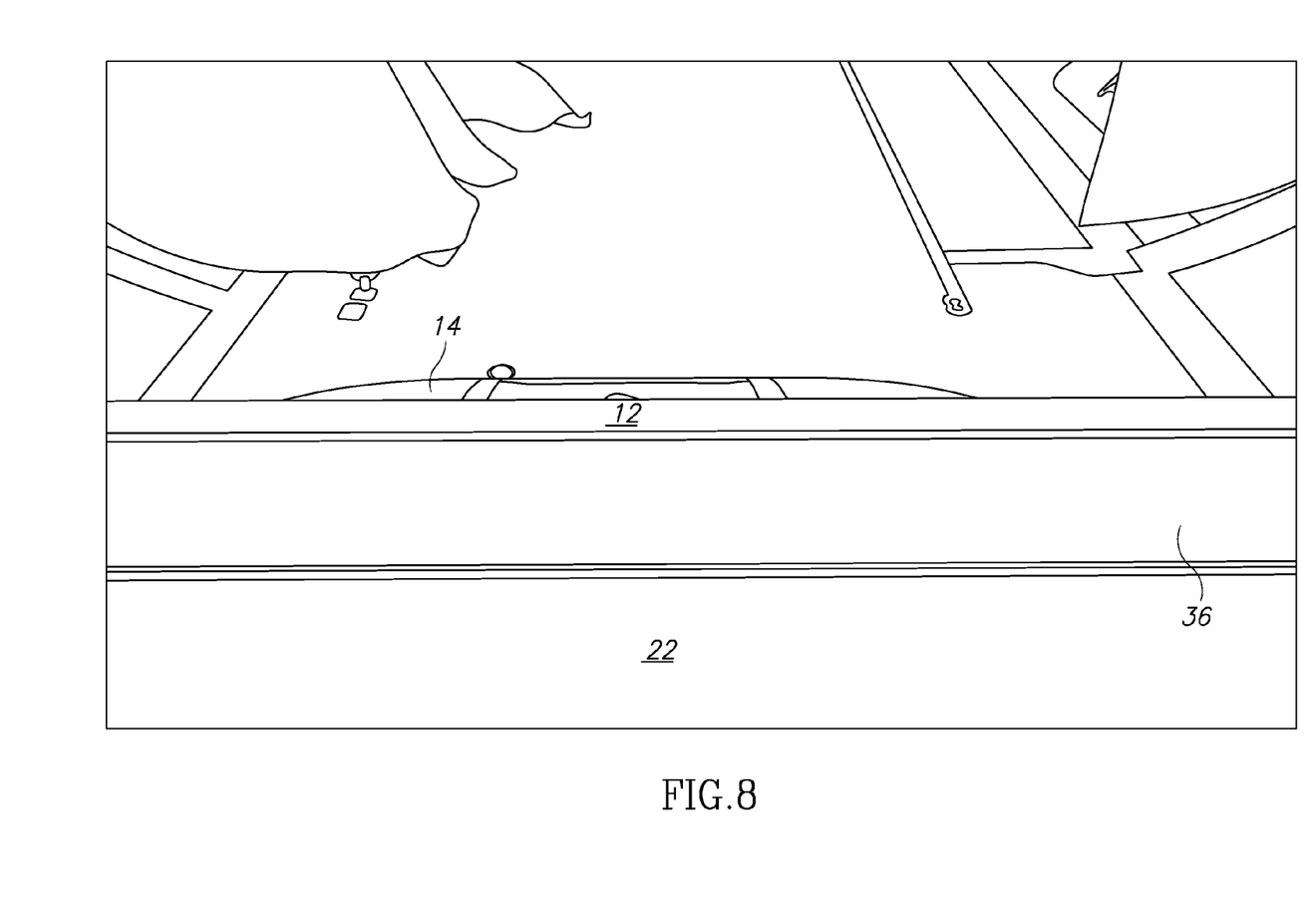
FIG. 8 is a rear view of the cargo stop block of FIG. 5.
Figure 9:
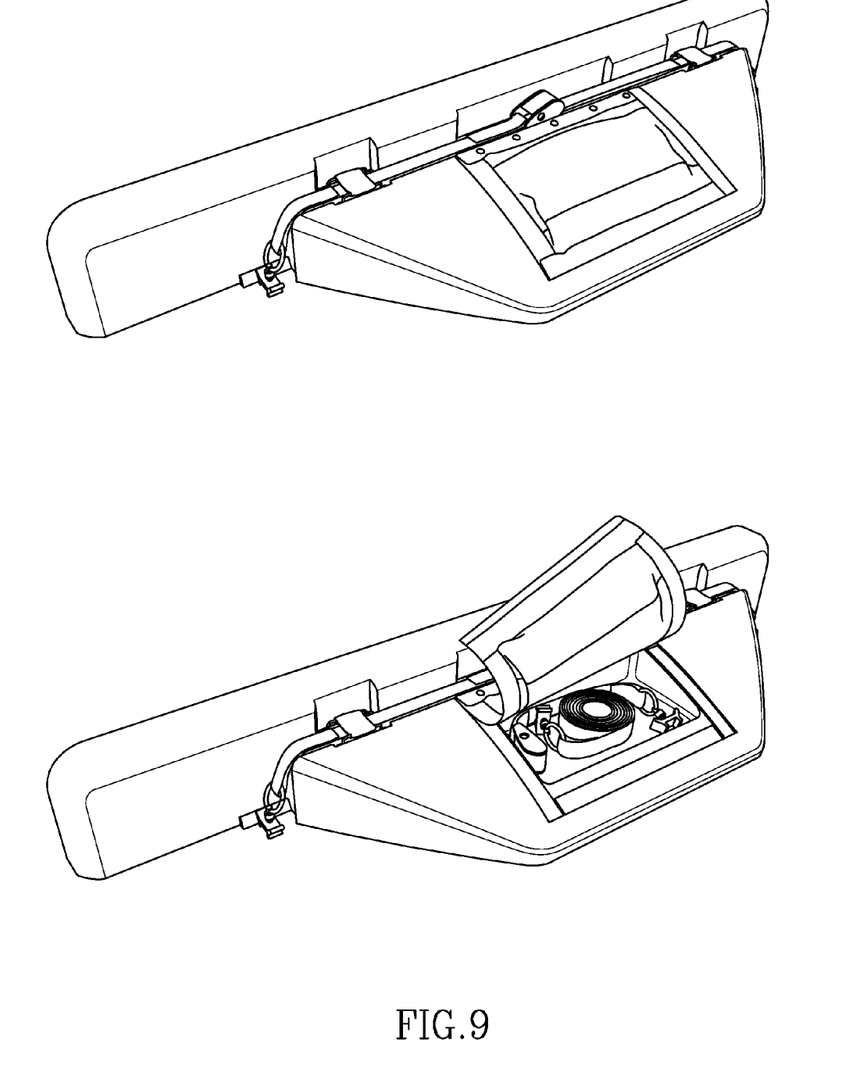
FIG. 9 is a comparison of the cargo stop block of FIG. 5 shown with the storage compartment in a closed state and in an open state.
Figure 10:
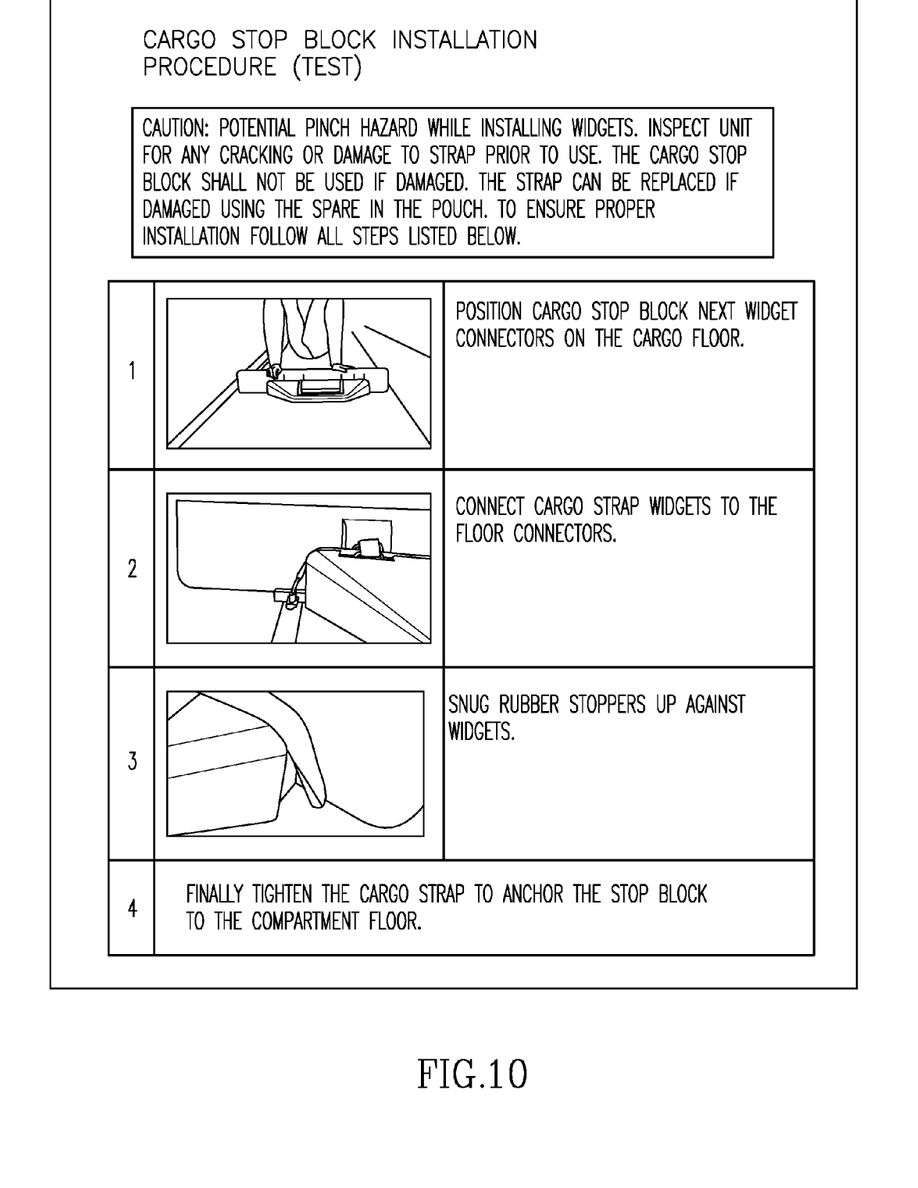
FIG. 10 is an instruction sheet for installation of the cargo stop block of FIG. 5.
Figure 11:
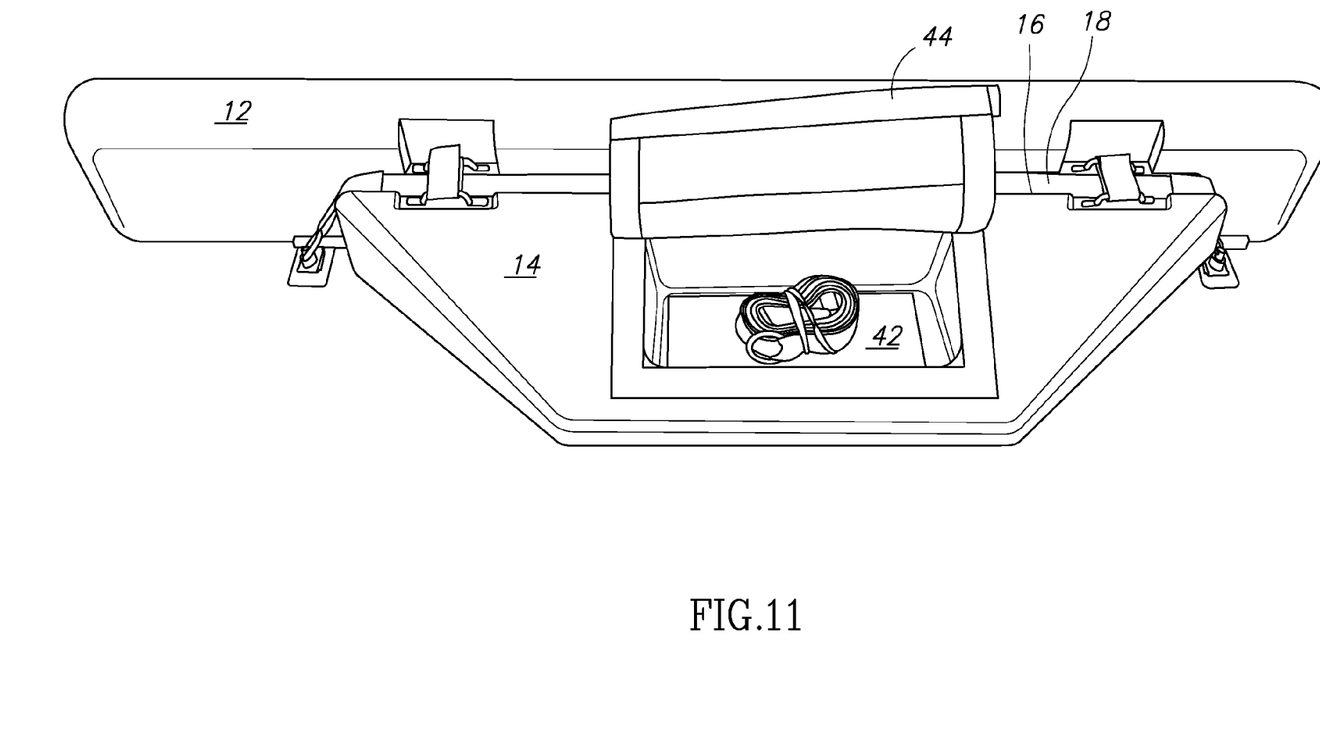
FIG. 11 is a front view of the cargo stop block of FIG. 5 installed in the cargo compartment of a commercial jet aircraft.
Figure 12:
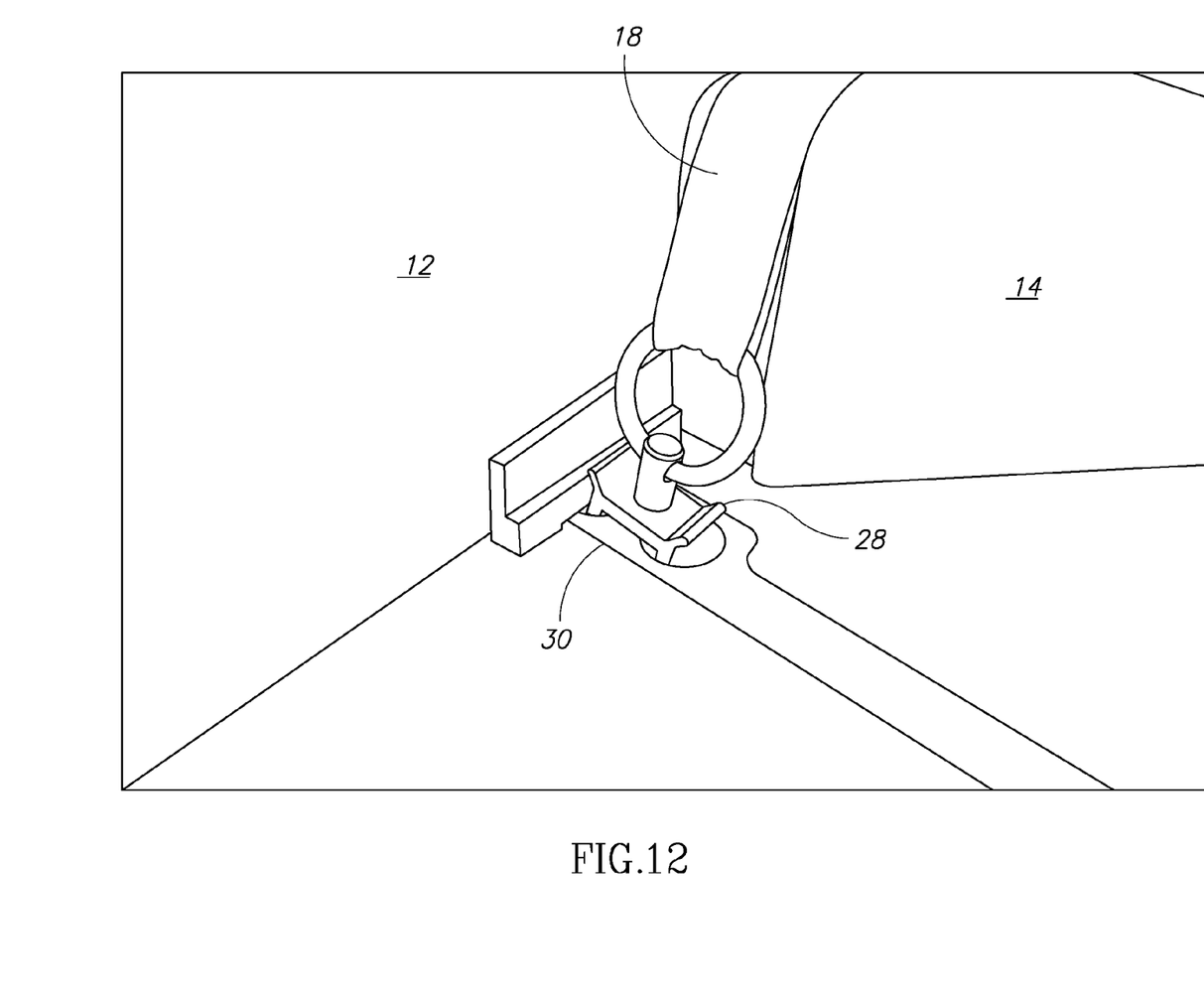
FIG. 12 is an enlarged front left side perspective view of the cargo stop block of FIG. 5 installed in the cargo compartment of a commercial jet aircraft showing an attachment member of a tie down strap holding the cargo stop block in position and being anchored to the cargo compartment floor using a cargo net anchor.

As best seen in FIG. 3, the cargo engagement wall member portion 12 has a rearward facing wall 36 which has sufficient height and width to provide a stop wall preventing forward movement of the cargo when it engages the rearward facing wall. Engagement of cargo against the rearward facing wall 36 under a forward force, such as when the cargo is tending to slide forward, can apply a significant force to the upper portion of the rearward facing wall, which would tend to apply a rotational force to the cargo engagement wall member portion 12 about its longitudinal axis. The cargo stop block 10 includes the backing member portion 14 extending sufficiently forward from the cargo engagement wall member portion 12 to resist rotational movement of the cargo engagement wall member portion. This prevents the cargo stop bock 10 from flipping over during use. The strap receiving recess 16 preferably has a lower wall which is lower to the cargo compartment floor 22 than the upper wall of the cargo engagement wall member portion 12 to further reduce the tendency of the cargo stop block 10 to rotate about its longitudinal axis during use when the tie down strap 18 is tensioned to apply a downward force on the cargo stop block.

A rubber or other material non-slip pad 38 is attached to the underside of the cargo engagement wall member portion 12 and preferably the backing member portion 14 to better grip the cargo compartment floor 22 and resist slipping of the cargo stop block 10 along the cargo compartment floor.

Rubber bumpers 40 may be used on forward facing port and starboard end wall portions of the cargo engagement wall member portion 12 at locations which will be adjacent to and butt up against the cargo net anchors 30 when the cargo stop block 10 is in use to provide cushioning between the cargo engagement wall member portion and the cargo net anchors and absorb impacts experienced.

A second embodiment of a cargo stop block 10 is shown in FIGS. 5-15. The illustrated second embodiment of the cargo stop block 10 has the same fundamental construction as the first embodiment, but includes a storage compartment 42 formed in a top side of the backing member portion 14 for storage of a spare tie down strap 18. A flexible cover 44 is releasable attached along three sides to the backing member portion 14 using VELCRO® hook and loop fastener fastening strips to secure the cover to the backing member portion when the cover is closed.

The cargo stop block 10 may be made from any suitably durable and strong material or combination of materials. Further, the shape of the cargo stop block 10 may be varied from the two embodiments illustrated with still performing the same basic function.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedia components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A cargo stop for use with a tie down strap with attachment members attachable to anchors in a floor usable for carrying cargo, comprising:
   an elongated cargo engagement wall member portion having a rearward facing elongated engagement wall sized for engagement with cargo to resist forward movement of cargo engaging the engagement wall beyond the engagement wall, the cargo engagement wall member portion having left and right end portions;
   an elongated backing member portion rigidly connected to the cargo engagement wall member portion and projecting forward beyond the cargo engagement wall member portion, the backing member portion having left and right end portions, the left end portion of the backing member portion being located adjacent to the left end portion of the cargo engagement wall member portion and the right end portion of the backing member portion being located adjacent to the right end portion of the cargo engagement wall member portion; and
   an elongated strap receiving recess sized to receive the tie down strap, the strap receiving recess having left and right open end portions and a middle portion extending therebetween, the left end portion of the recess being located between the left end portion of the cargo engagement wall member portion and the left end portion of the backing member portion and the right end portion of the recess being located between the right end portion of the cargo engagement wall member portion and the right end portion of the backing member portion.

2. The cargo stop of claim 1, wherein the cargo engagement wall member portion and the backing member portion are formed as an integral, one-piece unit.

3. The cargo stop of claim 1, wherein the cargo engagement wall member portion has a bottom side portion positionable adjacent to the floor and the backing member portion has a bottom side portion positionable adjacent to the floor, and further including one or more non-slip pad portions positioned at one or both of the bottom side portion of the cargo engagement wall member portion and the bottom side portion of the backing member portion for engagement with the floor.

4. The cargo stop of claim 1 for use in
   an aircraft cargo compartment usable for carrying cargo and having laterally spaced apart port and starboard walls, wherein
   the cargo engagement wall member portion having a length sized to position the left end portion of the cargo engagement wall member portion in proximity with the starboard wall of the cargo compartment and the right end portion of the cargo engagement wall member portion in proximity with the port wall of the cargo compartment.

5. The cargo stop of claim 4, wherein the left end portion of the cargo engagement wall member portion extending laterally beyond the left end portion of the backing member portion and the right end portion of the cargo engagement wall member portion extending laterally beyond the right end portion of the backing member portion.

6. The cargo stop of claim 1, wherein the strap receiving recess is located adjacent to the juncture of the cargo engagement wall member portion and the backing member portion.

7. The cargo stop of claim 1, wherein the strap receiving recess is formed in the backing member portion.

8. A cargo stop for use with a tie down strap with attachment members attachable to anchors in a floor usable for carrying cargo, comprising:
   an elongated cargo engagement wall member portion having a rearward facing elongated engagement wall sized for engagement with cargo to resist forward movement of cargo engaging the engagement wall beyond the engagement wall, the cargo engagement wall member portion having left and right end portions;
   an elongated backing member portion connected to the cargo engagement wall member portion and projecting forward beyond the cargo engagement wall member portion, the backing member portion being connected to the cargo engagement wall member portion to resist forward movement of the cargo engagement wall member portion when the engagement wall is engaged by cargo, the backing member portion having left and right end portions, the left end portion of the engagement wall extending laterally beyond the left end portion of the backing member portion and the right end portion of the engagement wall extending laterally beyond the right end portion of the backing member portion; and
   an elongated strap receiving recess sized to receive the tie down strap, the strap receiving recess has left and right open end portions and a middle portion extending therebetween, the left open end portion of the recess being located between the left end portion of the cargo engagement wall member portion and the left end portion of the backing member portion, and the right open end portion of the recess being located between the right end portion of the cargo engagement wall member portion and the right end portion of the backing member portion.

9. The cargo stop of claim 8, wherein the strap receiving recess is located adjacent to the juncture of the cargo engagement wall member portion and the backing member portion.

10. The cargo stop of claim 8, wherein the strap receiving recess is formed in the backing member portion.

* * * * *